United States Patent [19]
Robinson et al.

[11] Patent Number: 5,637,219
[45] Date of Patent: Jun. 10, 1997

[54] MEANS FOR CONTINUOUS DIGESTION OF ORGANIC MATTER

[75] Inventors: Lee F. Robinson; Stephen C. Skill; Jack Bentley, all of London, England

[73] Assignee: Graesser Contactors Limited, London, United Kingdom

[21] Appl. No.: 341,542

[22] PCT Filed: Mar. 25, 1994

[86] PCT No.: PCT/GB94/00635

§ 371 Date: Nov. 18, 1994

§ 102(e) Date: Nov. 18, 1994

[87] PCT Pub. No.: WO94/21565

PCT Pub. Date: Sep. 29, 1994

[30] Foreign Application Priority Data

Mar. 25, 1993 [GB] United Kingdom ............. 9306226

[51] Int. Cl.⁶ ............................................. C02F 3/28
[52] U.S. Cl. ............................ 210/603; 210/616; 210/619; 210/150
[58] Field of Search .................... 210/150, 151, 210/603, 619, 612, 614, 615, 616

[56] References Cited

U.S. PATENT DOCUMENTS

| | | | |
|---|---|---|---|
| 3,389,798 | 6/1968 | Hartmann et al. | 210/619 |
| 3,649,209 | 3/1972 | Coleby | 23/270 |
| 4,160,736 | 7/1979 | Prosser | 210/619 |
| 4,200,532 | 4/1980 | Iwatani et al. | 210/151 |
| 4,211,647 | 7/1980 | Freidman et al. | 210/619 |
| 4,282,102 | 8/1981 | Rooney | 210/616 |
| 4,289,626 | 9/1981 | Knopp et al. | 210/616 |
| 4,956,082 | 9/1990 | Choi | 210/619 |
| 4,999,302 | 3/1991 | Kahler et al. | 210/619 |
| 5,281,335 | 1/1994 | Kuhn | 210/619 |
| 5,290,435 | 3/1994 | Stilkenboom | 210/151 |
| 5,326,459 | 7/1994 | Hlavach et al. | 210/619 |
| 5,395,529 | 3/1995 | Butler | 210/619 |

FOREIGN PATENT DOCUMENTS

| | | |
|---|---|---|
| 0 144 279 | 6/1985 | European Pat. Off. |
| 3016920 | 11/1981 | Germany . |
| 79/01095 | 12/1979 | WIPO . |
| 92/10431 | 6/1992 | WIPO . |

*Primary Examiner*—Christopher Upton
*Attorney, Agent, or Firm*—Oliff & Berridge

[57] ABSTRACT

A multi-stage process for the digestion or conversion of organic matter includes supplying organic material-containing liquid (with or without solid) feed stock mixture to an inlet port in a multi-stage reactor vessel and causing micro organic or catalytic agents to digest or otherwise convert the organic matter within the interior of the reactor vessel to form liquid and/or gaseous by-product(s). The reactor includes an outer body portion defining an internal chamber and an inner rotatable rotor assembly. The rotor assembly has at least two plate members placed about a common central axis and constructed to divide the chamber into a series of three or more compartments, each compartment being bounded by a pair of oppositely located plate members or by a plate member and an end of the vessel.

16 Claims, 3 Drawing Sheets

MEANS FOR CONTINUOUS DIGESTION OF ORGANIC MATTER

FIELD OF THE INVENTION

The present invention relates to digestion or conversion of organic matter using microorganisms to produce methane gas.

BACKGROUND

Anaerobic digestion of organic matter to methane is a widespread process in natural environments. Methane production is a syntrophic process depending upon the action of several types of microorganisms, for example anaerobic bacteria.

It is currently accepted that there are four steps in the process, as shown in FIG. 1.

The initial stage of hydrolysis is performed by a variety of organisms, chiefly Clostridia. The majority of the intermediary products of the second stage, acidogenesis, are short chain fatty acids, hydrogen and carbon dioxide. The third stage (acetification) is the result of metabolism of fatty acids by $H_2$-producing acetogenic bacteria. These organisms are unable to grow at partial pressures of hydrogen $>10^{-3}$ atm. Thus, their maintenance within the methanogenic consortium depends on the continual removal of hydrogen by methanogens. This is known as interspecies hydrogen transfer.

About 70% of the methane generated by the anaerobic digestion of organic matter is produced from acetate by the acetoclastic methanogens. The remainder is derived from $H_2$ and $CO_2$ by the action of hydrogenotrophic methanogens. The acetoclastic methanogens are very slow growing and, thus, a high retention time is necessary for maximum methane production.

The pH for optimum growth of each member of the anaerobic consortia differs widely. In the acidogenic phase, the optimal pH is 5, and the optimal pH is 7 for the methanogenic phase.

The digestion of organic matter is now described.

Early digesters, see FIG. 2, resemble septic tanks in design. Most traditional digesters, FIG. 2a, were constructed in the form of up-right cylinder tanks into which the feedstock was pumped and from which the effluent was removed. Gas was vented from the top of the cylinder. In this type of digester very little mixing occurs, and a distinct sludge layer settles at the bottom of the digester. A thick layer of scum forms on top of the liquid fraction, which restricts the working volume of the digester.

The introduction of stirred digesters, FIG. 2b, resolved the problem of sludge settling and scum formation and, in addition, produced a relative increase in methanogenic activity. The increased metabolic turnover is due to better mixing of the methanogenic flocs with the substrate. Most digesters used for treatment of human or animal wastes are now of this basic design.

The use of anaerobic digestion as a treatment for low-strength, high volume wastes such as those from food processing plants causes the problem of washout of the methanogenic consortia from the digester, because of the high hydraulic loading rates necessary when the substrate is very dilute. One remedy for this problem is the immobilisation of the methanogenic flora on solid particles in the fixed film digester, shown in FIG. 2d. In this type of digester, the influent is pumped through a column of granules on which the methanogenic consortia develop. It was soon found that the settling properties of the methanogenic flocs were such that the solid particles in fixed film digesters were in many cases superfluous. A recent development is the up flow anaerobic sludge blank (UASB) digester, shown in FIG. 2c. In this design, the sludge layer is allowed to settle and the influent is pumped up through the sludge from the bottom of the digester. Mixing occurs as the gas is produced and rises through the sludge.

In all the above digesters, the entire process takes place within one chamber or stage, as a batch process. There are certain disadvantages associated with conventional single stage digester designs. One-stage digesters are susceptible to the effects of substrate overloading. When this occurs the digester pH falls as the volatile fatty acids accumulate in excess, and both acetogenesis and methanogenesis are inhibited. This imbalance can be corrected by stopping the flow of substrate in the digester until the flora has equilibrated and methanogenesis recommences. Inhibition due to overloading is costly in terms of both labour and lost methane production.

One approach which has been adopted to overcome this and other problems is the construction of two-stage digesters. In digesters of this design, hydrolysis and acidification are separated from acetification and methanogenesis. The two stage digester has the following potential advantages:

(i) it allows better operation of both phases of digestion;
(ii) it reduces inhibition of methanogenesis due to substrate overloading; and
(iii) it is less susceptible to changes in feedstock composition.

However, a two-stage batch process remains large in volume and is more complex (and therefore more costly) both to establish and control.

The above digesters are capable of digesting small suspended particles of organic matter. However, the treatment of a high solids contents material is inefficient due to the inadequate solids mixing mechanisms. Mass transfer at high solids loadings is inefficient, requiring a substantial energy inventory. For example, various trials have been conducted to assess the feasibility of digesting sorted municipal waste. Efficient mixing and mass transfer of the high solids has not been achieved in conventional single and two-stage digesters, see FIG. 3, and consequently methanogenesis is inhibited.

SUMMARY OF THE INVENTION

According to this invention there is provided a multi-stage process for the digestion of organic matter, which comprises supplying organic material-containing liquid/solid feedstock mixture to an inlet port in a multi-stage reactor vessel and causing microorganisms or catalytic agents to decompose the organic matter within the interior of the vessel to form fluid and gaseous by-products. The reactor comprises an outer body portion defining an internal chamber and an inner rotatable rotor assembly, the rotor assembly comprising at least two spaced plate members affixed about a common central axis and constructed to divide the chamber into a series of three or more compartments, each compartment being bounded by a pair of oppositely located plate members or by a plate member and an end of the vessel.

BRIEF DESCRIPTION OF THE DRAWINGS

In order that the invention may be illustrated, more easily understood and readily carried into effect, reference will now be made to the drawings, by way of non-limiting example only and wherein:

FIG. 2 shows a series of designs of known anaerobic digesters;

DESCRIPTION OF PREFERRED EMBODIMENTS

Figures 2A, 2B:
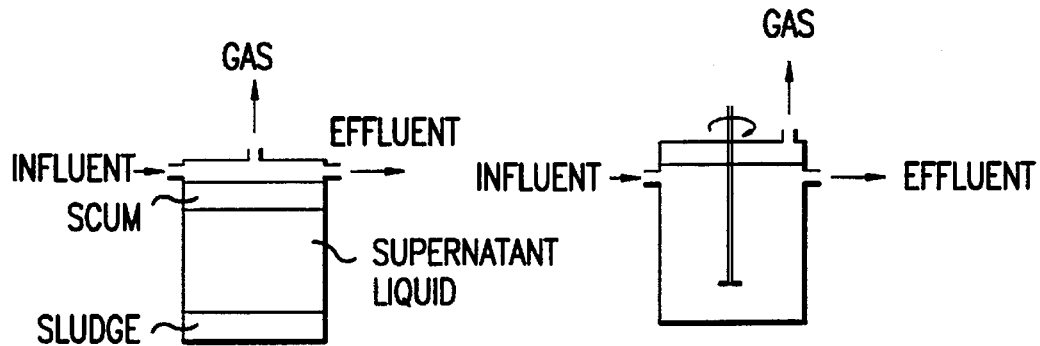
FIG. 2a is a conventional unstirred digester.
FIG. 2b is a high-rate stirred digester.
Figures 2C, 2D:
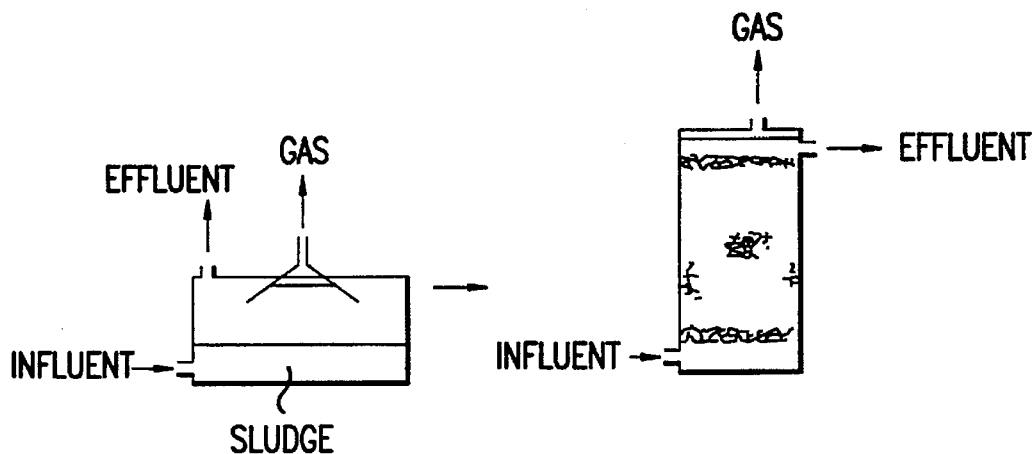
FIG. 2c is an up flow anaerobic sludge blanket (USAB) digester.
FIG. 2d is an anaerobic stationary-bed fixed film digester.
Figure 4:
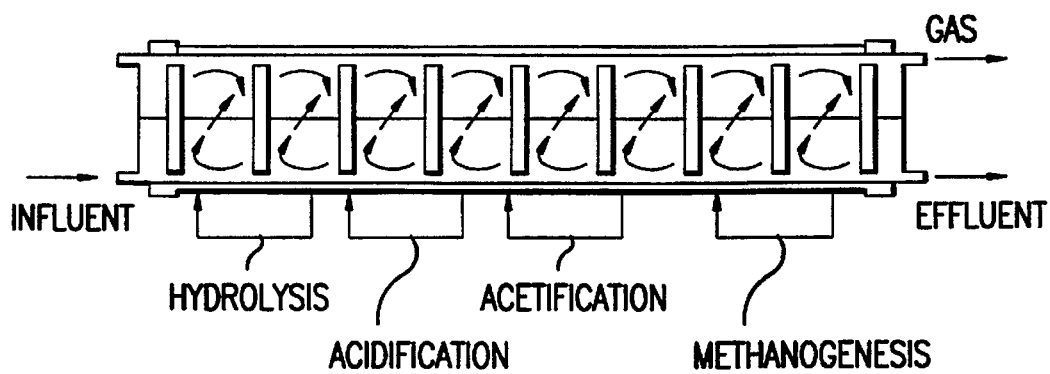
FIG. 4 shows a preferred liquid/liquid or liquid/solid contactor for low speed mixing, suitable for use in the present process with compartments forming zones for the 4 stages.
Figure 5:
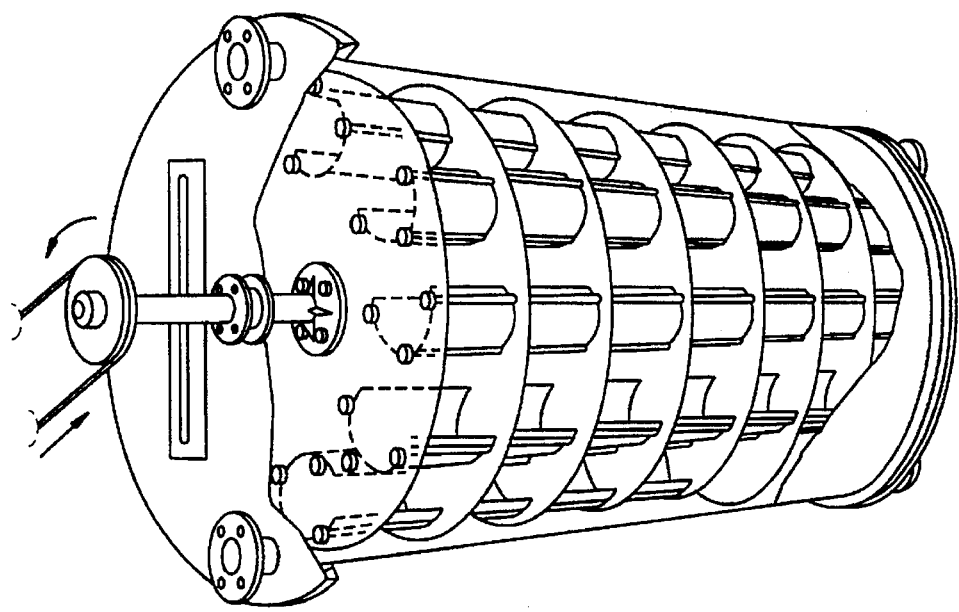
FIG. 5 is a schematic cut-away illustration showing the internal parts of a "Graesser" contactor, which can be used to carry out the process shown in FIG. 4.
Figure 6:
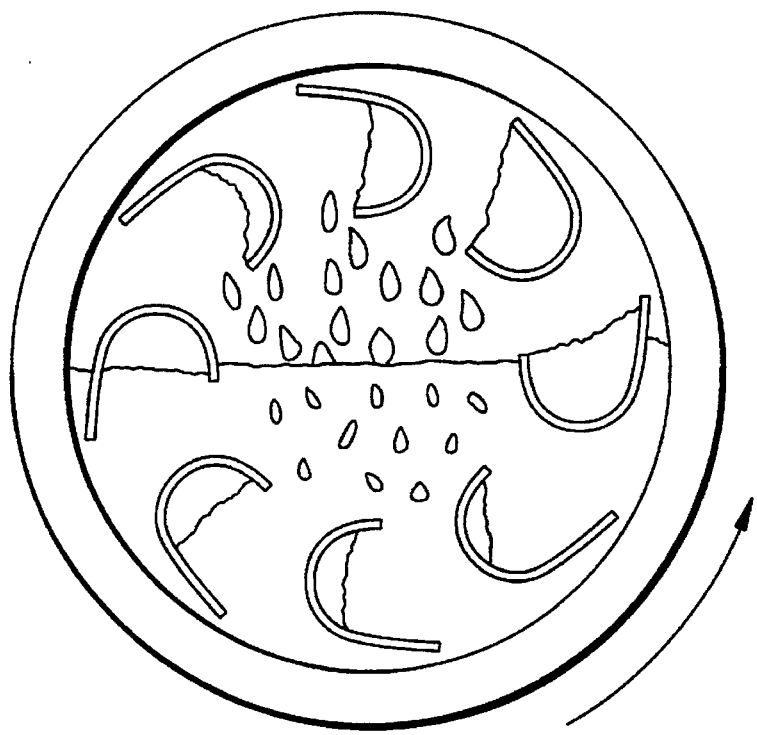
FIG. 6 is an elevation, between two plate members, of the "Graesser" contactor in use, showing liquid/liquid or solid/liquid contact (mixing) within one chamber of the multi-stage apparatus.

As shown in these drawings, other than FIG. 2 which has been previously described in connection with prior art digesters, one suitable and particularly preferred multi-stage vessel is a liquid/liquid or liquid/solid contactor for low speed mixing, such as the contactor made and sold by the applicants under the Trademark—Graesser Contactor. It is schematically illustrated in FIGS. 4, 5 and 6 and has been commercially available, although hitherto not specifically for biological digestion. The advantages of using a Graesser Contactor for biological transformations and especially for anaerobic digestion of organic matter are summarized below. As seen in FIGS. 4, 5 and 6, adjacent plate members are linked by a series of radially spaced scoops (colloquially referred to as 'buckets') and the view of FIG. 6 shows rotation of the rotor causing mixing of material within a compartment by what has also become colloquially known as the 'raining-bucket' principle.

The Graesser Digester Solids rotor for high solids waste has the following particular advantages:

(a) It is a Multistage Continuous Contactor—the number of compartments within the vessel can be altered by increasing or decreasing the number of plate members;

(b) It can provide efficient solids mixing, and good heat and mass transfer;

(c) There are relatively low operating costs (the central rotor has a fairly slow rotation), which in turn means that a low energy input rotating device can be used; such as a low power motor.

(d) The digestion gas produced can be arranged to vent from the methanogenic phase only;

(e) Temperature control can be arranged by platecoils, there is an option for applying insulation to the outer shell; and heat pumps may be used to recover heat; and (f) A specially designed solids rotor can be used for high solids-containing liquid material to be processed.

FIG. 4 shows a schematic cross-section, for example, only an eight chamber contactor of the "Graesser" type with an inlet for influent liquid material, which can have a relatively high solids content, containing the organic matter to be digested or converted. In the first two compartments, hydrolysis may be arranged to take place, as described in, e.g., FIG. 1. In the next two compartments, acidification may occur, as similarly described in FIG. 1. Acetification can take place in the next two compartments and, finally, methanogenesis may occur in the last two compartments. There is an outlet for effluent liquid and evolved gas.

Sludge from one or more sections downstream of the Graesser may be recycled back to the start of digestion phase. For example, the acetogenic zone in the contactor may be maintained within a number of rotor compartments defining that zone by recycling sludge from the final stage of the acetogenic region to the initial stages of the acetogenic region. The same principle can apply to the Hydrolytic, Acidification and Methanogenic zones. The slower growing methanogens may occupy more compartments than zones containing the faster growing members of the anaerobic consortia.

The pressure inside the vessel during biological transformations can be lowered or elevated if required, facilitating efficiency.

The pH, temperature, dilution, and gas venting may be easily controlled along the length of the contactor within the zones, facilitating maintenance of the different optimal growth environment for each member of the anaerobic consortia.

Such optimal conditions can ensure efficient and rapid digestion, thus reducing hydraulic retention times and plant size and cost.

The "Graesser" contactor, if used, may be maintained up to pressures of 2000 psi when physical or chemical transformations are required, i.e., hydrolysis and pyrolysis. A potential difference could be applied in different compartments.

The present process, using a Graesser or similar contactor, can treat even very dilute streams using a liquid/liquid rotor for low strength high volume waste. In such an arrangement, the microbial flora can be immobilized upon support particles in several compartments of the contactor. The liquid to be processed can be fed continuously through the contactor, enabling very large throughputs. The species of the consortia of organisms bound to support particles, if used, can vary along the length of the contactor, i.e., according to the particular digestion or conversion zone. Different pH and temperature regimes can be established along the contactor's length providing predetermined growth conditions for each member of the microbial consortia. The internal arrangement of the contactor may be such that particles cannot escape from one compartment to the next.

Specific flora for each stage of digestion, i.e., hydrolysis-acidification-acetification-methanogenesis can be confined to that zone (one or more compartments) which is intended for that stage.

Industrial organic material-containing wastes can also be processed by the reactor as well, including highly persistent or recalcitrant organics.

Methane and other gases generated such as carbon dioxide can be recovered, and used, e.g., methane for industrial combustion processes.

The mass transfer of liquid feedstock entering the vessel with extremely high solids content can be improved by the incorporation of assisting bars (not shown), which connect the adjacent plate members at their outer periphery.

Gas or liquid by-product recovery can be enhanced by increasing pressure, e.g., anaerobic digestion under specific pressures prevents gas production, allowing conversion of organic feed into organic acids. Organic acids may be recovered from the fluid phase, for example by solvent extraction in a further vessel. Thus, in addition to digestion of organic matter, the present process may also be used for chemical conversions, which are not a complete digestion process.

An example of how the process can be operated follows, using a Graesser contactor.

The members of the consortia in each zone will depend on the organic substrate being treated or converted.

During startup of the contactor (reactor), the reactor would be treated as a single stage batch system. That is to say, the reactor would be filled with substrate feedstock and a mixed population of bacteria from another process (sewage sludge digestion for example) would be used to seed the reactor in the conventional manner. As soon as the consortia had established itself and methanogenesis was occurring, fresh substrate would be introduced at the input end of the reactor. At the same time, zonal sludge recycling would commence. In this way, different classes of consortia would develop in different zones along the length of the reactor naturally. The rate of zonal sludge recycling and the length of the zone may be varied to establish optimal conditions for the type of substrate to be treated or converted.

The reactor substrate is by no means limited to wastes. Substrates may be complex organic material(s) feedstock which requires converting to simpler or specific compounds.

Liquid is transferred from compartment to compartment in the classical Graesser manner. The same holds for solids. Transfer of liquids from the end to the beginning of the zones would be carried out by pumps or similar variable mass transfer devices (not shown).

The end product of the effluent will be dependent on the substrate. With some substrates, further treatment may be necessary. Further downstream processes may include aerobic digestion or treatment of the liquid with photosynthetic based systems. Digestion of organic material is usually accompanied by the release of nitrogen and phosphorus containing compounds into the aqueous phase. Biocoil systems containing algae may be used to recover these elements from the aqueous phase for incorporation into algae biomass.

The digestion process duty may involve the recovery of digestion products from the effluent. This may be carried out by solvent extraction in a subsequent Graesser contactor.

With reference to waste treatment, the quality of the feed substrate is often expressed in terms of its Biological Oxygen Demand (BOD). If the process is operated such that methane production is optimised, BOD will be reduced in the final discharge, as a result of carbon being removed from the aqueous phase to the gas phase as methane.

If, however, the system is operated under elevated pressure, therefore inhibiting gas production, the BOD will not be reduced in the final effluent. However, the carbon will be in the form of short chain organic acids. Solvent extraction of these acids enables their recovery as a liquid fuel. Therefore, to assess the performance of the digestion process, the relative complexity (number of carbon atoms per molecule) in the feedstock substrate may be compared with the carbon chain length in the discharge. Alternatively, if the feed substrate has a high solids content, the difference in the solids content of the feed and discharge may be used as a measure of process performance.

Examples of feedstock substrates include, but without limitation thereto:

Wastes from processing industries such as waste liquids containing organic matter to be digested or converted from the following industries: meat, fish, fruit, vegetables, dairy, fermentation industry, animal wastes, palm oil, tapioca, waste water treatment sludge. Other feedstock substrates include, for example, municipal wastes, such as night soil, municipal solid waste and sewage sludge.

Figure 1:
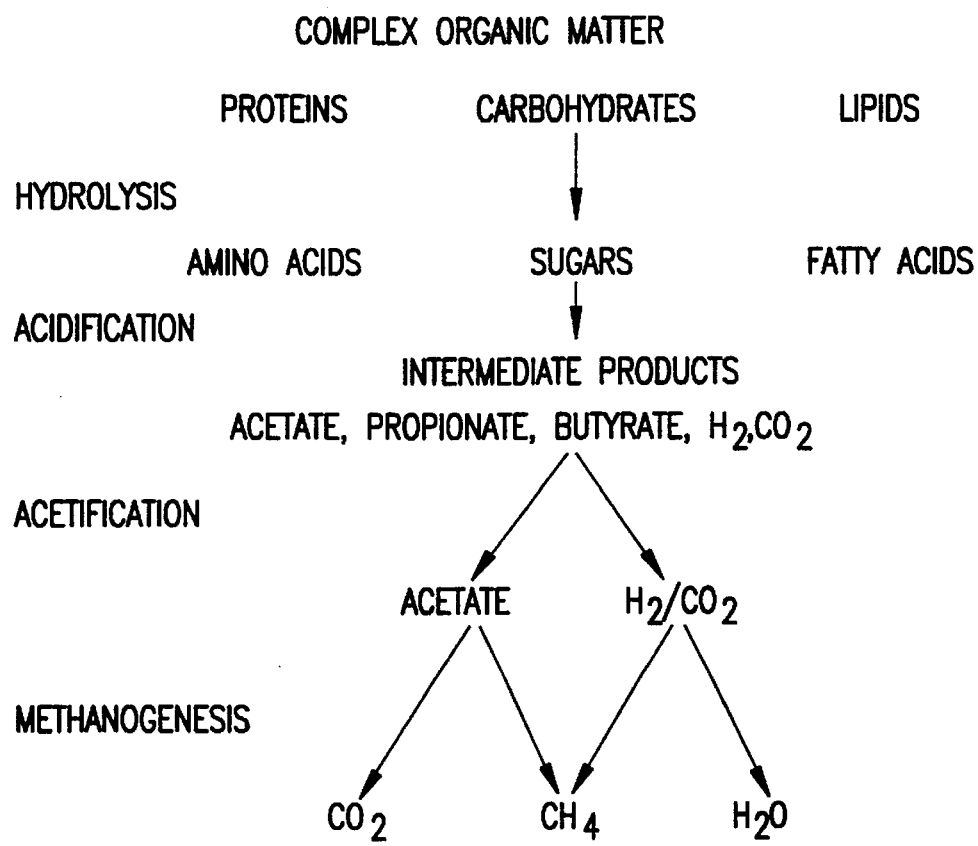
FIG. 1 is a simple flow chart describing the biological digestion process, identifying the stages in the anaerobic digestion of organic matter.
Figure 3:
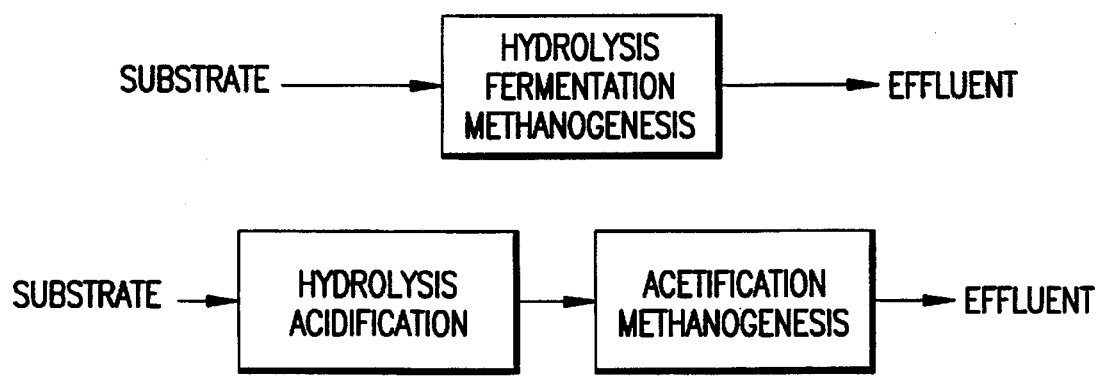
FIG. 3 shows the principle of single stage (upper) and two stage (lower) anaerobic digester designs.

The microorganisms which may be used in the present process are any of those capable of converting an organic compound to another compound, if the process is a conversion process, or capable of 'digesting' one or more organic compounds according to one or more stages of microbial anaerobic digestion as typified in, for example, FIG. 1 of the accompanying drawings. Such microorganisms will be well known to those skilled in the art and may comprise, for example, organisms of the type Clostridia. For a more detailed explanation of the anaerobic digestion process and for even more examples of microorganism that can be used in the present process, the reader is referred to a known text in the field, in particular, "Waste Water Engineering: Treatment, Disposal, and Re-Use", published by Metcalf and Eddy, Inc, 3rd Edition, 1991, Chapter 8. Guidance will also be found in this reference for which microorganisms could usefully be introduced at which zone, to carry out a process as shown schematically in FIG. 4.

Within a contactor of the 'Graesser' type, as shown in, e.g., FIG. 4, the number of internal plate members can be varied so that a zone for carrying out any given stage in the anaerobic digestion process can be one chamber (defined by opposing plate members) or a multiple of chambers, e.g., 2, 3, 4, 5 or even 6 such chambers.

The optimum number of chambers to use for any given such zone can be established routinely using trial and error testing.

In one example of a contactor constructed to particularly carry out the process, there may be a total of 4 compartments, each one for carrying out one stage of the anaerobic digestion process as indentified in, for example, FIG. 1.

In other embodiments, the total number of chambers might be 8, 12, 16 or even 20 compartments defined by opposing plate members, with the possibility that a chamber is defined by one end plate of the vessel and one facing plate member on the rotor.

What is claimed is:

1. A multi-stage process for the digestion or conversion of organic matter, comprising:
    (a) supplying organic material-containing liquid or liquid-and-solid feedstock mixture to an inlet port in a multi-stage reactor vessel, and
    (b) causing microorganisms or catalytic agents in suspension to digest or otherwise convert said organic matter within the interior of said vessel to form liquid and/or gaseous by-product(s),
    the reactor comprising an outer body portion defining an internal chamber and an inner rotatable rotor assembly, said rotor assembly comprising at least two spaced plate members affixed about a common central axis and constructed to divide the chamber into a series of three or more compartments, each compartment being bounded by a pair of oppositely located plate members or by a plate member and an end of said vessel and having discrete, radially spaced U-shaped scoops within said compartment integral with said plate members,
    the U-shaped scoops are located concentrically about an axis of rotation of the rotor assembly, and spaced from said axis in a vicinity of an outer periphery of said plate members.

2. A process as claimed in claim 1, wherein the vessel is a liquid/liquid or liquid/solid contactor.

3. A process as claimed in claim 2, wherein the contactor has an inlet for influent feedstock and outlets for treated effluent and for gas generated during the process.

4. A process as claimed in claim 2, wherein the contactor has four, eight, twelve, sixteen or twenty compartments.

5. A process as claimed in claim 1, wherein one or more compartments are constructed and the process is operated to provide four stages of anaerobic digestion, comprising hydrolysis, acidification, acetification and methanogenesis in adjacent zones over the length of the internal chamber.

6. A process as claimed in claim 5, wherein methane gas is vented from said methanogenesis stage only.

7. A process as claimed in claim 1, wherein one or more of the following process parameters are controlled or varied: pH, temperature, pressure, dilution of feedstock, gas generation, gas venting, growth environment for a particular member of anaerobic consortia.

8. A process as claimed in claim 7, wherein different pH and temperature regions are established over the length of the reactor vessel to provide predetermined growth conditions for each member of the microbial consortia.

9. A process as claimed in claim 1, wherein organic material within the feedstock is converted to other organic material.

10. A process as claimed in claim 9, wherein said process is a continuous anaerobic digestion process of organic matter.

11. A process as claimed in claim 1, wherein the microorganisms comprise microbial species immobilized on a support, which are confined to operate within either a given compartment of the reactor vessel or within a given zone of said reactor vessel that comprises more than one compartment.

12. A process as claimed in claim 11, wherein said support comprises particulate material.

13. A process as claimed in claim 1, wherein sludge from a downstream section of the reactor vessel is recycled back to the start of the digestion phase.

14. A process as claimed in claim 1, wherein the feedstock comprises one or more of the following organic material-containing liquid or liquid/solid compositions:

processing industry wastes, human or animal wastes, waste water treatment sludge, municipal or industrial wastes, organic material-containing soil, or sewage sludge.

15. A process as claimed in claim 1, wherein sludge from a downstream compartment of the reactive vessel is recycled back to one or more upstream compartments.

16. A process as claimed in claim 1, wherein each of the U-shaped scoops comprises an inner and an outer wall member, the outer wall member being closer to a periphery of the plate member and being longer than said inner wall member.

\* \* \* \* \*